United States Patent [19]
Proeschl et al.

[11] B 3,981,539
[45] Sept. 21, 1976

[54] WAGON DOOR CONTROL SYSTEM AND DUAL CAM THEREFOR

[75] Inventors: Bernard E. Proeschl; Ralph C. Schell, both of Decatur; James M. Stanley, Oreana, all of Ill.

[73] Assignee: Caterpillar Tractor Co., Peoria, Ill.

[22] Filed: Sept. 30, 1974

[21] Appl. No.: 510,588

[44] Published under the second Trial Voluntary Protest Program on January 27, 1976 as document No. B 510,588.

[52] U.S. Cl. ............................ 298/35 M; 91/358 A; 105/240; 105/311 R
[51] Int. Cl.² ............................................ B60P 1/56
[58] Field of Search .................. 298/24, 27, 29, 30, 298/31, 32, 33, 34, 35 R, 35 M, 36, 37; 91/358 A; 105/311 R, 286, 287, 239, 240, 244–246; 222/504, 503

[56] References Cited
UNITED STATES PATENTS

| | | | |
|---|---|---|---|
| 2,927,541 | 3/1960 | Lunde | 298/35 M X |
| 3,289,546 | 12/1966 | Erickson | 91/358 A |
| 3,427,075 | 2/1969 | Kress et al. | 298/35 M |

*Primary Examiner*—Frank E. Werner
*Attorney, Agent, or Firm*—Wegner, Stellman, McCord, Wiles & Wood

[57] ABSTRACT

Apparatus for controlling the operation of dump doors of a wagon or the like, permitting the operator to set a control lever selectively in a closed or open position, with the apparatus effecting the desired selective movement of the doors and returning the control lever to a "Hold" position upon completion of the desired movement. The apparatus includes a cam device responsive to the movement of the doors to the selected position for releasing the control lever and thereby terminating the driving of the doors to the selected position. The apparatus alternatively may provide a single full movement of the doors or a sequential movement, as desired.

12 Claims, 9 Drawing Figures

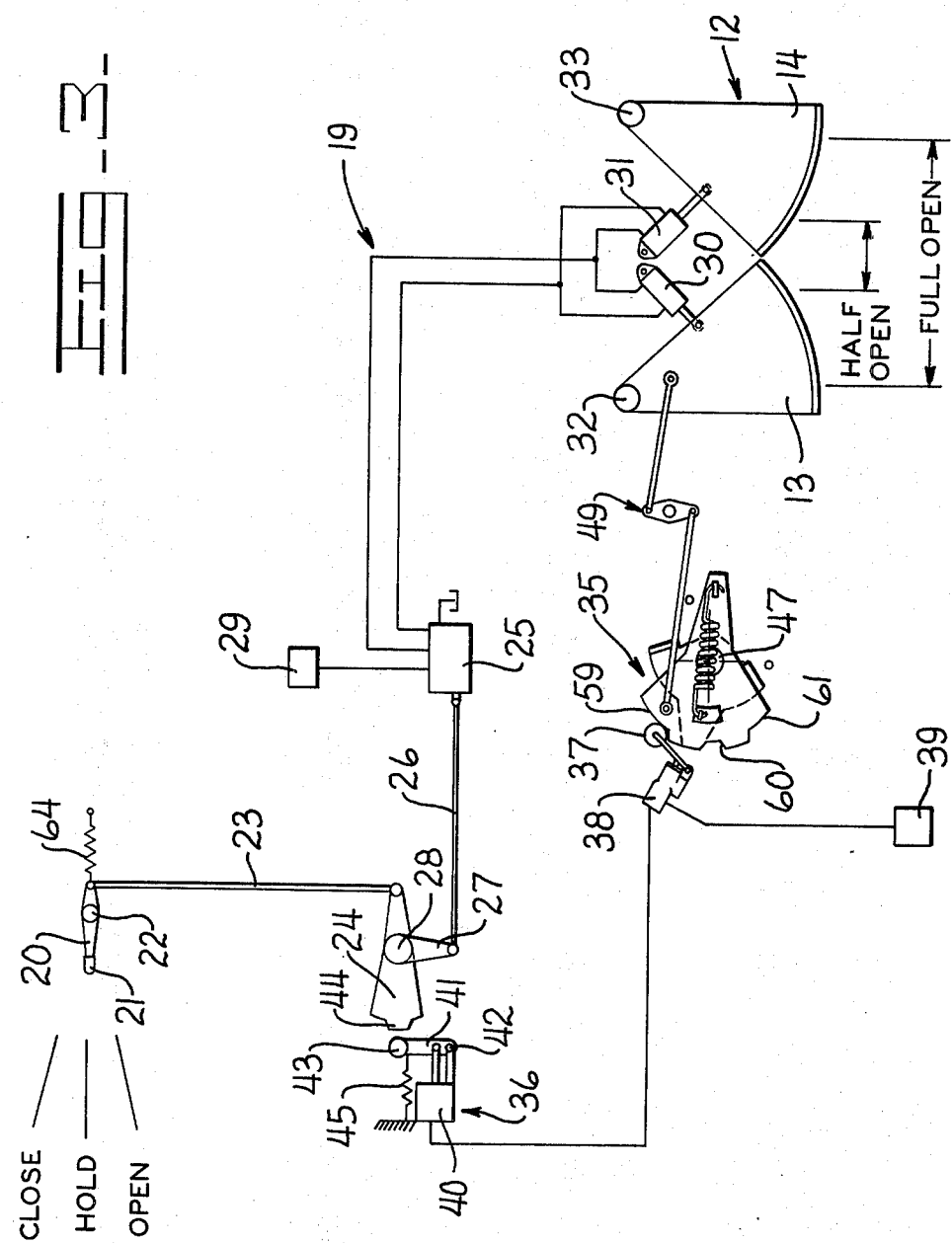

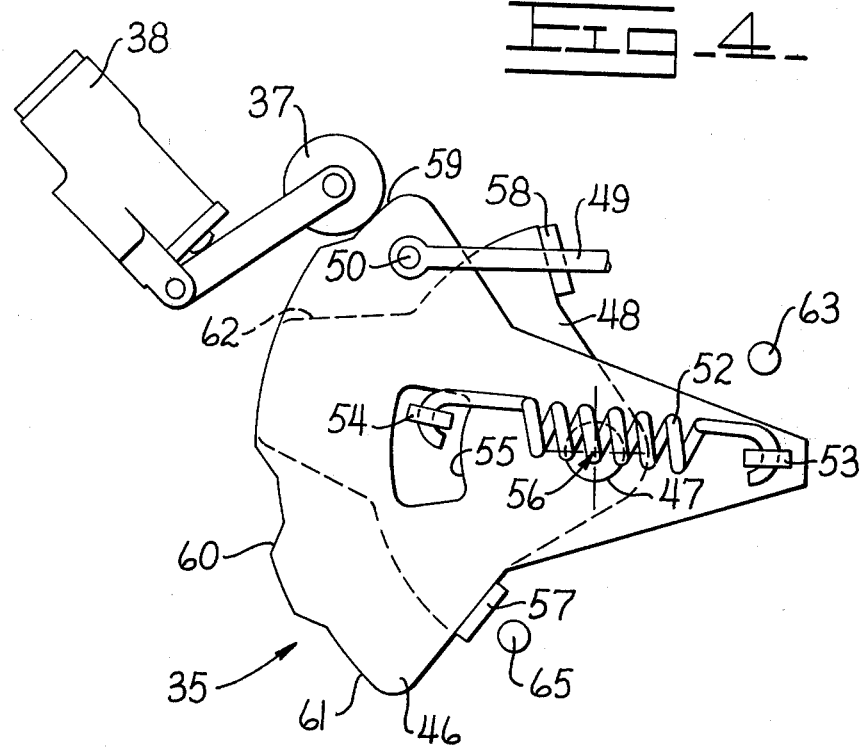
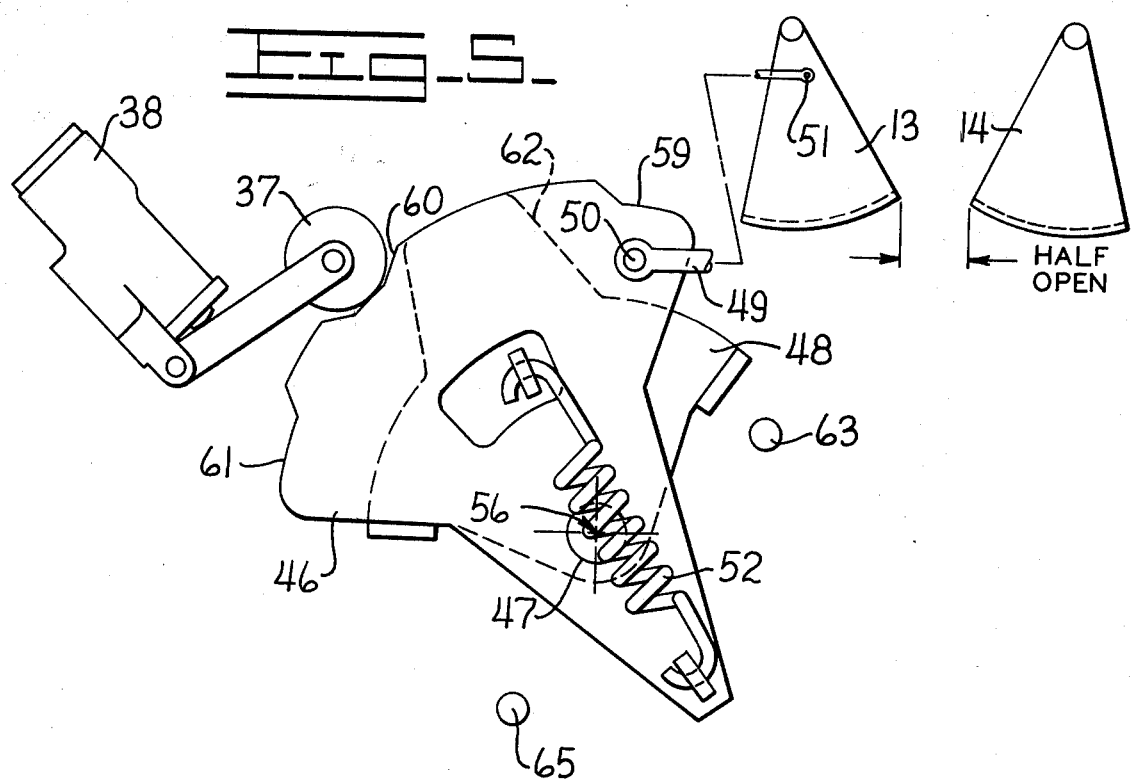

3,981,539

WAGON DOOR CONTROL SYSTEM AND DUAL CAM THEREFOR

BACKGROUND OF THE INVENTION

1. Field of the Invention

This invention relates to material handling equipment and in particular to means for controlling the dump doors of a material carrier.

2. Description of the Prior Art

In one conventional form of material carrier, a wagon is drawn by a tractor and is provided with dump doors in a bottom portion thereof for selectively discharging the carried material downwardly therefrom to suitable receiving means. Conventionally, the dump doors are selectively positioned by a hydraulic operator and control means for controlling the operator are provided in the tractor.

SUMMARY OF THE INVENTION

The present invention comprehends an improved apparatus for controlling the positioning of such dump doors, and more specifically comprehends the provision of such positioning control means providing a semiautomatic function and permitting the operator to select the desired movement of the doors with the apparatus effecting the desired movement without further attention by the operator. Thus, the apparatus frees the operator for full attention to other matters, such as driving of the vehicle, and eliminates the need for the operator to visually inspect the position of the doors in order to effect the desired material handling operations.

The invention comprehends providing, in the tractor, a lever control which may be selectively positioned by the operator in a "Close" or an "Open" position. Operation of the lever to the selected position effects operation of a hydraulic power means operator powering suitable hydraulic drive means associated with the doors for swinging the doors to the desired position. The apparatus includes means for latching the lever in the selected position until the doors reach the desired selected door position and thereupon releasing the control lever to a "Hold" position and concurrently discontinuing driving of the doors by the hydraulic operator.

The means for controlling the latching mechanism illustratively comprises cam means operated as a function of the position of the doors to control operation of the latching means. The cam means may be arranged to provide for stopping of the door movement at a half-open position and in a full open position in the opening movement of the doors. The cam means may be arranged to prevent stopping of the doors in the half-open condition during the closing movement. Alternatively, the cam means may be arranged to provide a single full opening movement of the doors.

The cam means may operate the latching mechanism through an intermediate fluid-operated transducer, and in the illustrated embodiment, the operating means comprises a pneumatic control. The cam means may be connected to the door means by suitable linkage and may be pivotably movable, with the linkage effecting the desired control of the pivotal position of the cam means as a function of the door position.

The apparatus is extremely simple and economical of construction while yet providing the improved door control functioning discussed above.

BRIEF DESCRIPTION OF THE DRAWING

Other features and advantages of the invention will be apparent from the following description taken in connection with the accompanying drawing wherein:

FIG. 3 is a schematic diagram illustrating the control and operating mechanism of the apparatus;

FIG. 4 is a fragmentary enlarged side elevation of the cam means as arranged when the doors are in the closed position;

FIG. 5 is a fragmentary enlarged side elevation of the cam means as arranged when the doors are in the illustrated half-open position;

DESCRIPTION OF THE PREFERRED EMBODIMENT

Figure 1:
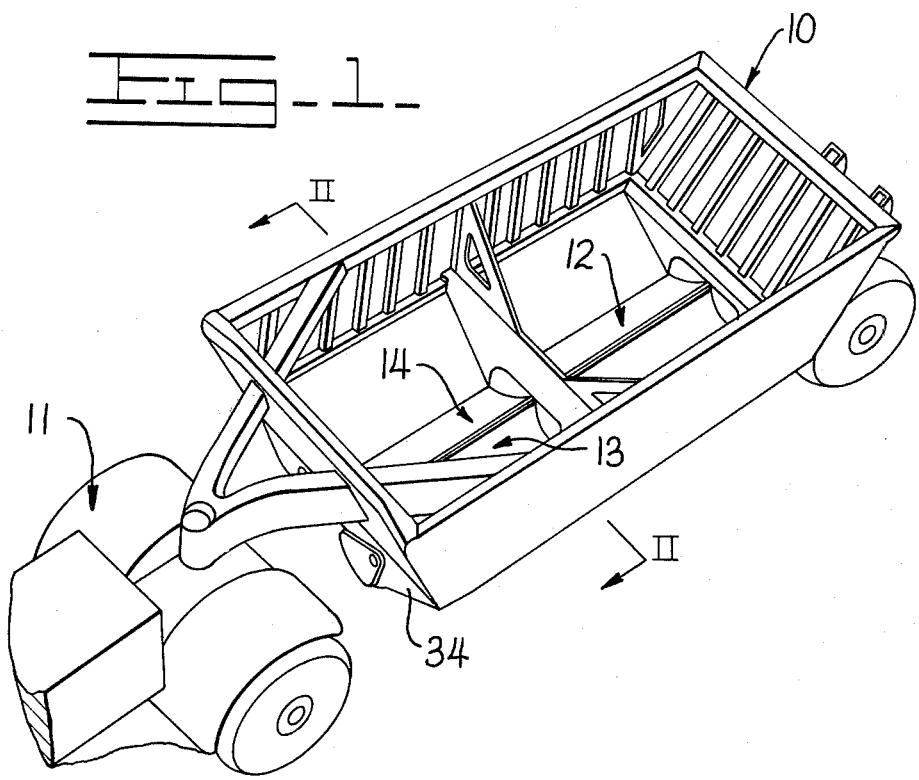
FIG. 1 is a fragmentary perspective view of a wagon and tractor having means for controlling the dump doors embodying the invention.

In the exemplary embodiment of the invention as disclosed in the drawing, a wagon 10 drawn by a tractor 11 is provided with door means generally designated 12 including a pair of dump doors 13 and 14 selectively closing a central opening 15 downwardly narrowing bottom wall 16 at the lower end of the side walls 17 of the wagon. The wagon defines an open top 18 adapted to receive material to be moved, such as earth, gravel, etc., and door means 12 is provided for selectively discharging the hauled material by suitably exposing the bottom wall opening 15.

Selective positioning of dump door means 12 is effected hereby by an improved apparatus generally designated 19 to provide a semiautomatic control of the door opening and closing operations.

As shown in FIG. 3, control apparatus 19 includes a control lever 20 having a manual grasping portion 21 and mounted on a suitable pivot 22 in the tractor 11 for controlling the movement of a link 23 connected to a bell crank member 24. As shown in FIG. 3, lever portion 21 may be selectively disposed in a Close position and in an Open position by a result of suitable manipulation by the operator. Lever 20 is normally disposed in an intermediate Hold position and is automatically restored to this position when the doors are positioned selectively in the closed or open position by suitable interconnecting means as will be brought out more fully hereinafter. Briefly, however, to effect an opening of the dump doors, the operator merely moves lever portion 21 to the Open position. Apparatus 19 maintains the lever in that position until the door means is disposed in the opened position and then automatically restores the lever to the Hold position. During this time, the operator is free to attend to other duties, such as steering the tractor, etc. When it is desired to close the door means 12, the operator moves the lever portion 21 to the Close position and apparatus 19 automatically effects movement of the doors to the closed position, whereupon the lever is again restored to the Hold position automatically.

Operation of door means 12 is effected herein by a hydraulic operator 25 which is actuated by a link 26 connected to a crank arm 27 pivotable with bell crank member 24 about a pivot 28. Hydraulic operator 25 is connected to a suitable source 29 of hydraulic pressure and is connected to a pair of hydraulic motors 30 and 31 controlling pivoting of doors 13 and 14, respectively, about respective pivots 32 and 33 carried on front wall 34 of the wagon.

The hydraulic operator is actuated in one direction when bell crank member 24 is pivoted in a clockwise direction by the movement of lever portion 21 to the Close position and is actuated in the opposite direction by the pivoting of bell crank member 24 in the opposite, counterclockwise direction by the movement of the lever portion 21 to the Open position.

The initial movement of door 13 causes an actuation of a cam means 35 controlling a detent latching mechanism 36 to latch the bell crank member 24 in the pivoted position thereby maintaining operation of hydraulic operator 25 to continue the movement of the dump doors to the selected opened or closed position. More specifically, cam means 35 includes a cam follower 37 controlling a pneumatic operator 38 connected to a suitable source 39 of pressurized air for selectively controlling the operation of an air motor 40 of detent mechanism 36. Motor 40 is connected to an arm 41 pivotally mounted on a pivot 42 to swing a detent roller 43 behind a projection 44 on bell crank member 24 thereby latching bell crank member 24 and control lever 20 in the selected position. Arm 41 is biased by a suitable spring 45 to urge detent roller 43 away from bell crank member 24 so that the latching action occurs only when motor 40 is energized by operator 38.

Figure 2:
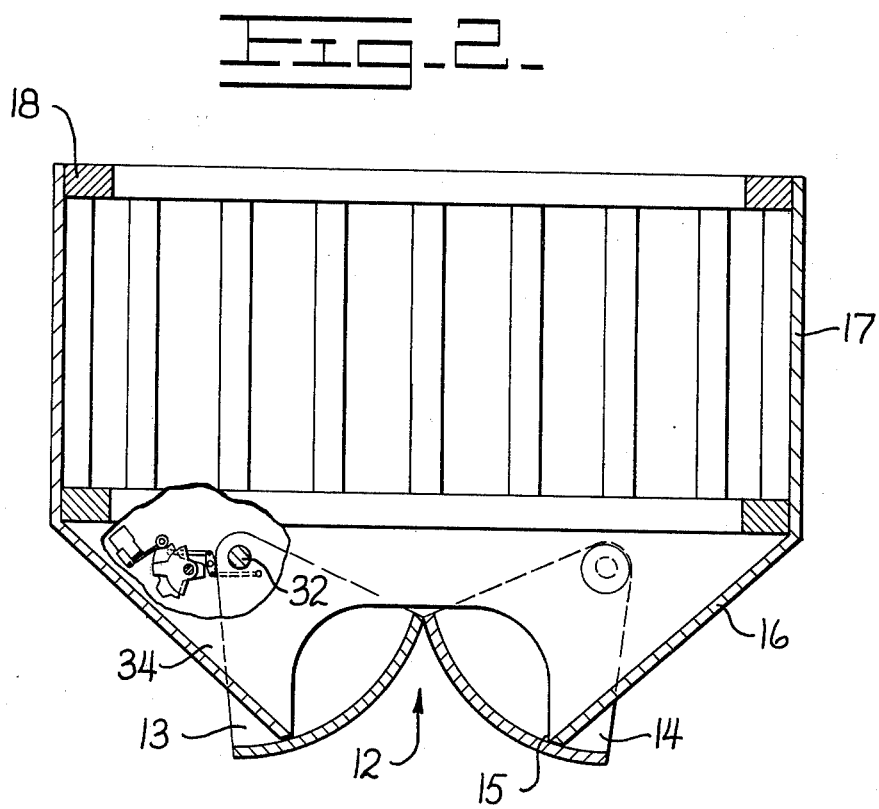
FIG. 2 is an enlarged transverse section taken substantially along the line 2—2 of FIG. 1.

Referring now to FIG. 4, cam means 35 includes a first cam member 46 pivotally mounted on a pivot 47 carried on the wagon front wall 34 adjacent pivot 32 of door 13 (see FIG. 2). An auxiliary cam member 48 is facially juxtaposed to cam member 46 and is also pivotally carried by pivot 47. Cam member 46 is connected to door 32 by a link and lever connector 49 having one end pivotally connected to cam member 46 at 50 and an opposite end pivotally connected to door 13 at 51 whereby cam member 46 is swung in a clockwise direction about pivot 47 as a result of opening movement of the door means, and is swung in a counterclockwise direction as a result of a closing movement of the door means, as best seen in FIG. 3. Cam member 48 is caused to move with cam member 46 by means of an over-center coil spring 52 having one end connected to a lug 53 on cam member 46 and an opposite end 54 on cam member 48 extending upwardly through a suitable opening 55 in cam member 46. As shown in FIG. 4, the coil spring extends to one side of the centerline 56 of pivot 47 when the cam member 46 is in abutment with a turned shoulder 57 on cam member 48. Cam member 48 includes an opposite turned shoulder 58 which limits opposite movement of cam member 46 relative to cam member 48.

Figure 6:
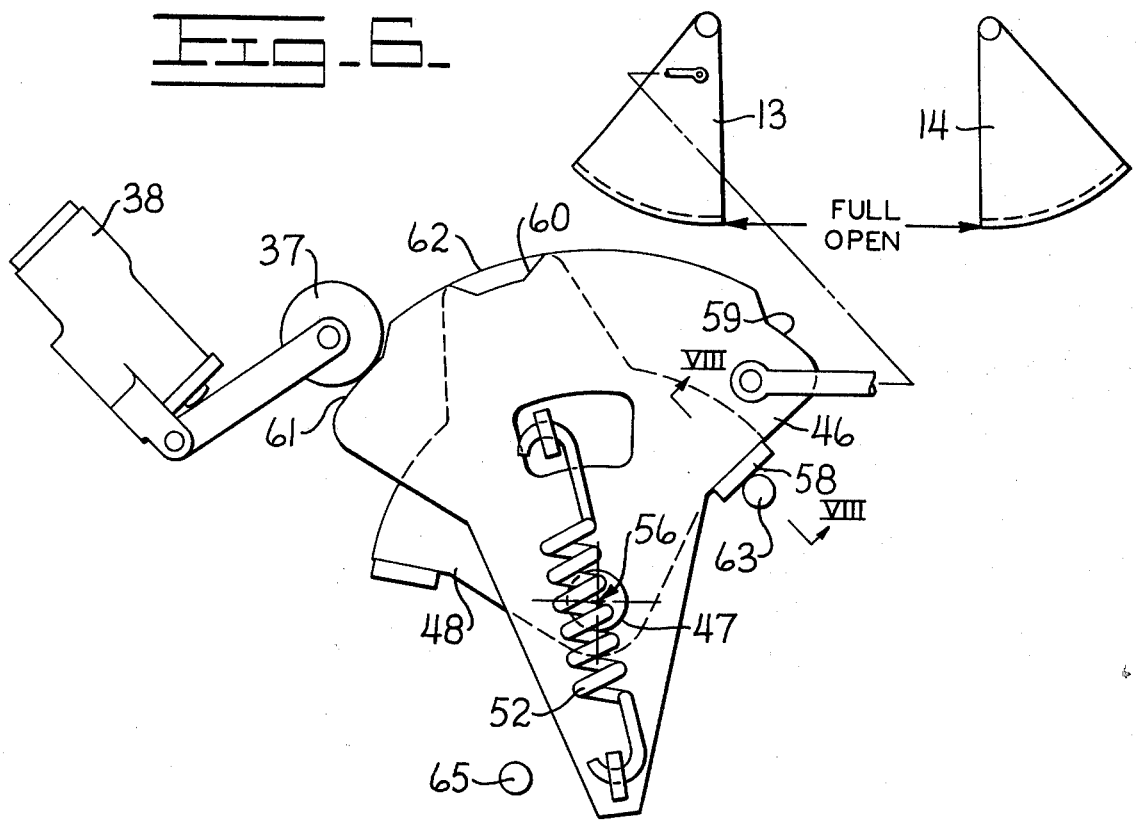
FIG. 6 is a fragmentary enlarged side elevation of the cam means as arranged when the doors are in the illustrated full open position, and with the auxiliary cam in a thrown overcenter position.

As best seen in FIGS. 4–6, cam member 46 defines a first recess 59, a second, intermediate recess 60, and a third, opposite recess 61 selectively receiving the cam follower roller 37.

Cam member 48 defines a projecting portion 62 which is arranged to prevent entry of the cam follower roller 37 into recess 60 when the projection is aligned therewith. Such alignment is effected by a swinging of the cam member 46 in a clockwise direction relative to the cam member 48 as a result of the abutment of shoulder 58 with a stop 63 and clockwise movement of cam member 46 to swing the spring to an opposite over-center position relative to the axis 56 of pivot 47, as shown in FIG. 6.

During moving of the door from the closed position of FIG. 4 to the partially opened position of FIG. 5, projection portion 62 of cam 48 is spaced laterally of the recess 60 of cam member 46 so that concurrent swinging of the cam members about pivot 47 permits cam follower roller 37 to move into recess 60 at an intermediate, half-open position of the door means. Referring to FIG. 3, when cam follower 37 is disposed in any of recesses 59, 60 and 61, operator 38 is de-energized, permitting spring 45 to withdraw the detent latch roller 43 from engagement with the crank arm member 24, thereby permitting a centering biasing spring 64 to restore the lever 20 to the center Hold position and to concurrently deactivate hydraulic operator 25 to terminate further movement of the door means.

In the event that all of the material in wagon 10 is not delivered by the half-opening of door means 12, the operator may more fully open the door means by again swinging the lever portion 21 to the Open position. Such manipulation reactivates hydraulic operator 25 and continued opening movement of door 13 causes continued clockwise movement of the cam members to move cam follower 37 from recess 60, thereby activating operator 38 and energizing motor 40 to latch the crank arm member 24 behind projection 44.

Referring now to FIG. 6, when door 13 reaches the full open position, cam follower roller 37 moves into recess 61. Slightly prior to this time, shoulder 58 engages stop 63 to prevent further clockwise movement of cam member 48 while permitting continued clockwise movement of cam member 46, thereby effecting the reversal of the over-center spring 52 relative to the pivot axis 56 of the cam members. Movement of roller 37 into recess 61 again deactivates operator 38 to de-energize motor 40 and release latching detent 43 from crank arm member 24, permitting the control lever to again be restored to the Hold position of FIG. 3.

Figure 7:
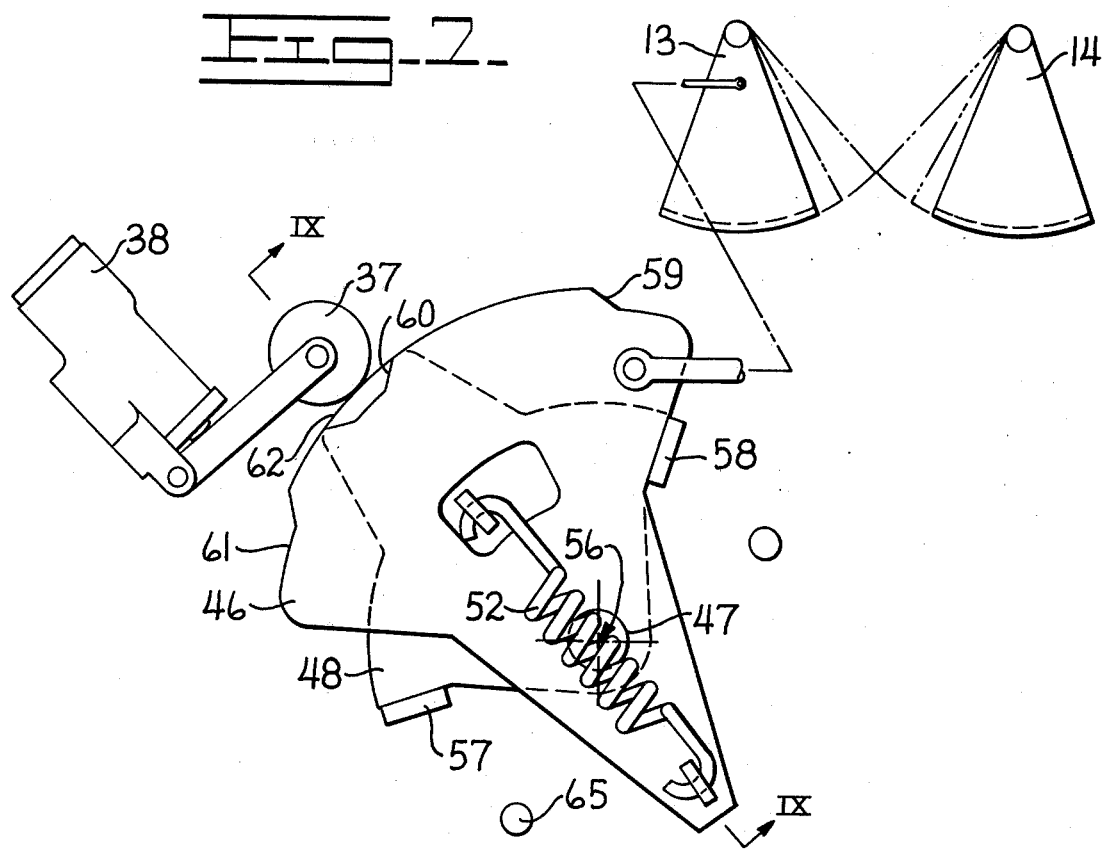
FIG. 7 is a fragmentary enlarged side elevation of the cam means illustrating a closing movement of the doors with the auxiliary cam means preventing termination of the movement at the half-open position.
Figure 8:
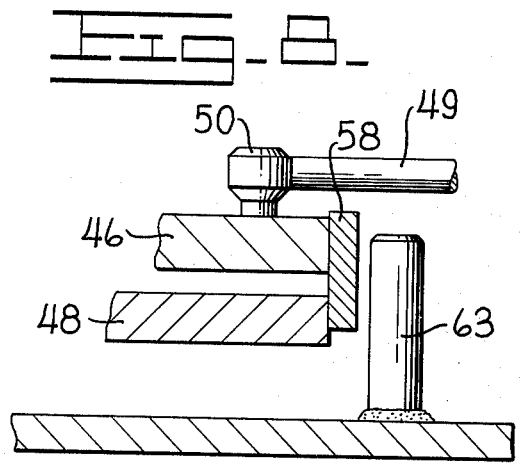
FIG. 8 is a fragmentary enlarged section taken substantially along the line 8—8 of FIG. 6.
Figure 9:
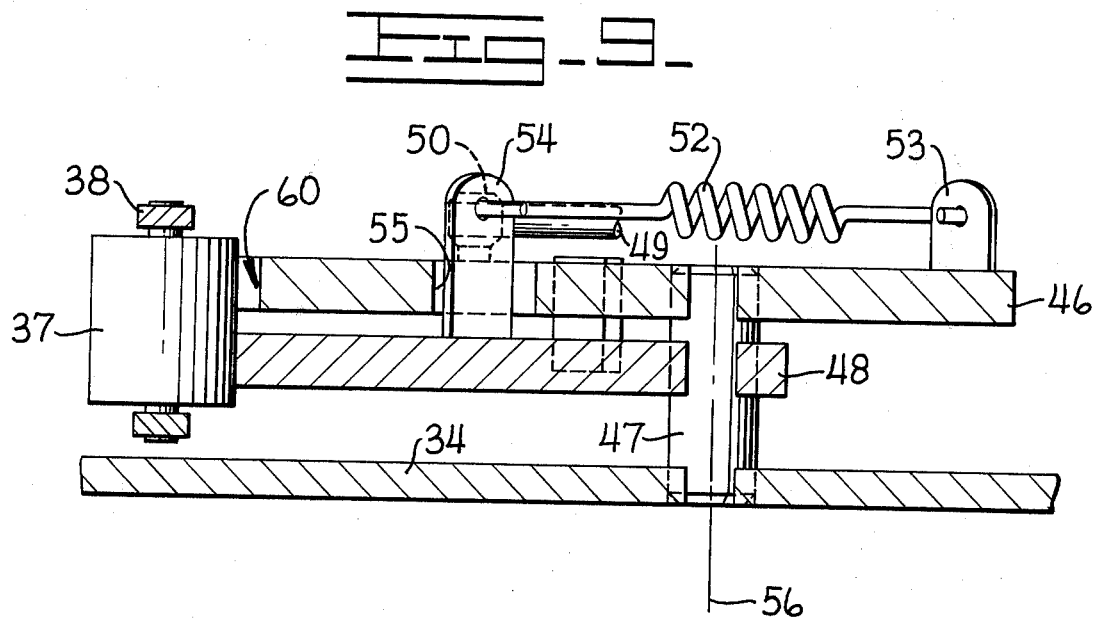
FIG. 9 is a fragmentary enlarged section taken substantially along the line 9—9 of FIG. 7.

Closing of door means 12 from either of the half-open or fully open position is effected by operator swinging the control lever portion 21 to the Close position, whereupon a reverse operation of operator 25 effects a reverse operation of hydraulic motors 30 and 31 to swing the doors 13 and 14 inwardly to close the hopper opening 15, as shown in FIG. 2. Movement of door 13 from the open position causes roller 37 to ride up from recess 61 by the counterclockwise movement of the cam members. However, as shown in FIG. 7, when the movement of the cam members reaches the point where roller 37 is aligned with recess 60, projecting portion 62 of cam member 48 prevents movement of the cam follower into recess 60 and closing movement of the doors is continued until cam follower roller 37 again is received in recess 59 of cam 46 in the fully closed position of the doors. Shoulder 57 engages a second stop 65 on wagon wall 34 in the counterclockwise extreme movement of cam member 48 to throw the over-center spring 52 to the original position of FIG. 4 with the projection 62 of cam member 48 disposed laterally of the recess 60, whereby a subsequent operation of the control means in a door opening operation again automatically stops the door movement at the half-open position as discussed above.

As will be obvious to those skilled in the art, cam member 48 and recess 60 may be eliminated where no provision for an intermediate open position need be provided. In such arrangement, the doors are swung reversely between the full open and full closed positions automatically by the selective positioning of the control lever 20.

As will be further obvious to those skilled in the art, the latching mechanism 36 may be directly operated by the cam means where the cam means and latching mechanism are provided on the same vehicle, the pneumatic operating means of the illustrated embodiment providing for facilitated remote disposition of the latching mechanism relative to the door and cam means. As will further be obvious to those skilled in the art, other suitable transducers may be utilized in controlling the latching mechanism by the cam means.

The door control apparatus of the present invention is extremely simple and economical of construction and provides facilitated positioning of the doors in the selected arrangement with the operator being free to attend to other duties once he has selected the desired positioning operation by momentary operation of the control lever 20.

The foregoing disclosure of specific embodiments is illustrative of the broad invention concepts comprehended by the invention.

We claim:

1. In a wagon having a movable dump door means, the improvement comprising: control means selectively manually positionable in an Open position and a Close position; power means responsive to the positioning of the control means in the Open position to move the door means to an open position and to the positioning of the control means in the Close position to move the door means to a closed position; powered means for throwing the control means to a Hold position from either of said Open and Close positions; and cam means responsive to the movement of the door means by said power means to either of said open and closed positions to operate said powered means to throw said control means to said Hold position thereby stopping further movement of the door means in the selected door position, said cam means including means for selectively arranging a camming portion thereof to operate said powered means to throw said control means to said Hold position selectively when said door reaches a preselected partially open position intermediate said closed and open positions.

2. The wagon means of claim 1 wherein said movement stopping means comprises means for releasably locking the control means in the selected Open or Close position during movement of the door means to the selected position.

3. The wagon means of claim 1 wherein said control means is arranged to permit the operator to control further movement of the door means from said partially open position selectively to the open position or to the closed position.

4. The wagon means of claim 1 wherein said first partially open position of the door means comprises a position wherein the door means are half open.

5. The wagon means of claim 1 wherein said cam means includes means for preventing stopping of movement of the door means at the partially open position where the door means are being moved from the fully open position to the closed position by said power means.

6. The wagon means of claim 1 wherein said cam means includes manually operable means for permitting the operator to prevent stopping of the door means in the partially open position when the power means is moving the door means from the fully open position.

7. The wagon means of claim 1 wherein said door means comprises a pair of pivotally mounted hopper doors.

8. The wagon means of claim 1 wherein said cam means comprises a pivotally mounted cam, means for pivoting the cam as a function of the movement of the door means, and cam follower means responsive to movement of the cam for controlling said powered means.

9. The wagon means of claim 1 wherein said powered means includes a fluid operator and said cam means includes a control valve selectively controlled by the cam follower means for controlling the operation of said fluid operator.

10. The wagon means of claim 1 wherein said cam means includes first and second cam members, means movably connecting said cam members for joint movement thereof, and means for selectively releasably pivoting the cam members in different preselected relationships.

11. The wagon means of claim 10 wherein said first cam member includes means defining a first operating position for causing operation of the powered means, and said second cam member defines means for selectively preventing operation of the powered means in said first operating position when the power means is moving the door means from said closed position.

12. The wagon means of claim 10 wherein said first cam member includes means defining a first operating position for causing operation of the powered means, and said second cam member defines means for preventing operation of the powered means in said first operating position when the power means is moving the door means toward said closed position.

* * * * *